(12) United States Patent
Jamadagni et al.

(10) Patent No.: US 9,661,544 B2
(45) Date of Patent: May 23, 2017

(54) METHOD AND SYSTEM FOR OFFLOADING HANDOVER OF WIRELESS CONNECTIONS FROM A LTE NETWORK TO A WI-FI NETWORK

(71) Applicant: Samsung Electronics Co., Ltd., Gyeonggi-do (KR)

(72) Inventors: Satish Nanjunda Swamy Jamadagni, Bangalore (IN); Rajavelsamy Rajadurai, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/182,959

(22) Filed: Feb. 18, 2014

(65) Prior Publication Data

US 2014/0233386 A1    Aug. 21, 2014

(30) Foreign Application Priority Data

Feb. 18, 2013  (IN) .............................. 711/CHE/2013
Nov. 8, 2013   (IN) ........................... 5046/CHE/2013

(51) Int. Cl.
*H04W 36/22* (2009.01)
*H04W 36/14* (2009.01)
(Continued)

(52) U.S. Cl.
CPC ............ *H04W 36/22* (2013.01); *H04W 36/14* (2013.01); *H04W 48/16* (2013.01); *H04W 48/18* (2013.01)

(58) Field of Classification Search
CPC ..... H04W 28/08; H04W 36/22; H04W 36/14; H04W 48/16; H04W 48/18
See application file for complete search history.

(56) References Cited

U.S. PATENT DOCUMENTS 8,635,335 B2 * 1/2014 Raleigh et al. ............... 709/224
8,780,857 B2   7/2014 Balasubramanian et al.
(Continued)

FOREIGN PATENT DOCUMENTS

JP   2012-182690    9/2012
KR   1020110116071  10/2011
(Continued)

OTHER PUBLICATIONS

Alcatel-Lucent, Alcatel-lucent Shanghai Bell, "Analysis of Solution 1", R2-132018, 3GPP TSG-RAN WG2#82, May 20-24, 2013, 4 pages.

(Continued)

*Primary Examiner* — Curtis A Alia
(74) *Attorney, Agent, or Firm* — The Farrell Law Firm, P.C.

(57) ABSTRACT

The various embodiments herein provide a method and system for providing network offloading in a wireless communication. The method comprising includes obtaining an Access Technology Selection Policy (ATSP) from at least one of Access Network Discovery and Selection Function (ANDSF), pre-configuration and Mobile Management Entity (MME), wherein the ATSP comprises of a plurality of radio access network selection criteria assistance default threshold values; modifying the ANDSF ATSP threshold values based on at least one of the radio characteristics and load conditions of the Radio Access Network (RAN) node by the RAN node; sending the modified ATSP threshold values to the UE; updating the ANDSF policy with the modified ATSP threshold values by the UE and determining offloading of the UE from a first radio access network to a second radio access network by the UE.

25 Claims, 6 Drawing Sheets

(51) Int. Cl.
*H04W 48/16* (2009.01)
*H04W 48/18* (2009.01)

(56) References Cited

U.S. PATENT DOCUMENTS

| | | | |
|---|---|---|---|
| 2005/0163089 A1* | 7/2005 | Purkayastha et al. | 370/338 |
| 2006/0291415 A1* | 12/2006 | Xu | 370/331 |
| 2010/0323698 A1 | 12/2010 | Rune et al. | |
| 2011/0117954 A1* | 5/2011 | Iwamura | H04W 36/0094 |
| | | | 455/525 |
| 2011/0170469 A1 | 7/2011 | Watfa et al. | |
| 2011/0292871 A1* | 12/2011 | Chin et al. | 370/328 |
| 2012/0039175 A1 | 2/2012 | Sridhar et al. | |
| 2012/0135739 A1* | 5/2012 | Paterson | C07K 14/195 |
| | | | 455/436 |
| 2012/0196644 A1 | 8/2012 | Scherzer et al. | |
| 2012/0282968 A1* | 11/2012 | Toskala et al. | 455/517 |
| 2012/0300750 A1* | 11/2012 | Chin et al. | 370/331 |
| 2013/0028172 A1 | 1/2013 | Lim et al. | |
| 2013/0084892 A1* | 4/2013 | Teyeb et al. | 455/456.6 |
| 2013/0308445 A1* | 11/2013 | Xiang | H04W 28/0231 |
| | | | 370/230 |
| 2014/0128075 A1* | 5/2014 | Da Silva | H04W 36/30 |
| | | | 455/436 |

FOREIGN PATENT DOCUMENTS

| | | |
|---|---|---|
| KR | 1020120104622 | 9/2012 |
| WO | WO 2011/129107 | 10/2011 |

OTHER PUBLICATIONS

European Search Report dated May 30, 2016 issued in counterpart application No. 14751705.6-1854, 8 pages.

* cited by examiner

METHOD AND SYSTEM FOR OFFLOADING HANDOVER OF WIRELESS CONNECTIONS FROM A LTE NETWORK TO A WI-FI NETWORK

PRIORITY

This application claims priority under 35 U.S.C. §119 to Indian Provisional Patent Application Nos. 711/CHE/2013 and 5046/CHE/2013, which were filed in the Indian Patent Office on Feb. 18, 2013 and Nov. 8, 2013, respectively, and Indian Complete Patent Application No. 711/CHE/2013, which was filed in the Indian Patent Office on Feb. 14, 2014, the entire content of each of which is incorporated herein by reference.

FIELD OF THE INVENTION

The present invention generally relates to wireless communications and more particularly relates to a method and apparatus for offloading of wireless connections between a Long Term Evolution (LTE) network and a Wireless Fidelity (Wi-Fi) network.

BACKGROUND OF THE INVENTION

Conventional wireless networks typically provide for handover operations or transactions in which a mobile device switches from a first channel to a second channel. Handover transactions can occur for a variety of reasons, some of the more common of which are to enable the mobile device to maintain a call or data session even when traveling in and out of the effective ranges of cells; to enable interoperability of disparate network technologies; to allow more efficient sharing of network resources; to avoid interference, or to better suit behaviour such as high travel speed or to enable required or desired features or services.

The term "Wi-Fi" is used in general as a synonym for "Wireless Local Area Network (WLAN)". Currently WLAN interworking and integration is supported by the 3GPP specifications at the core network level, including both seamless and non-seamless mobility to the WLAN. The current specification faces the one or more drawbacks such as the underutilization of the operator deployed WLAN networks, suboptimal user experience when the UE connects to an overloaded WLAN network, draining of UE power resources due to unnecessary WLAN scanning and so on.

Currently 3GPP provides interworking between Long Term Evolution (LTE) and Wi-Fi at a core network level but not at the RAN level. However, the existing methodologies do not address the problem of eNB controlling Wi-Fi offloading based on its radio characteristics and load scenarios.

The foregoing examples of the related art and limitations related therewith are intended to be illustrative and not exclusive. Other limitations of the related art will become apparent upon a reading of the specification and a study of the drawings.

SUMMARY OF THE INVENTION

The primary objective of the embodiments herein is to provide a method and system for offloading of wireless connections from a LTE network to a Wi-Fi network and vice versa.

The various embodiments herein provide a method and system for providing network offloading in a wireless communication. The method comprising the steps of, obtaining an Access Technology Selection Policy (ATSP) from at least one of Access Network Discovery and Selection Function (ANDSF), pre-configuration and Mobile Management Entity (MME), wherein the ATSP comprises of a plurality of radio access network selection criteria assistance default threshold values; modifying/updating/enhancing the ANDSF ATSP threshold values based on at least one of the radio characteristics and/or load conditions of the Radio Access Network (RAN) node by the RAN node; sending the modified/updated/enhanced ATSP threshold values to the UE by the RAN node; updating the ANDSF policy with the received modified ATSP threshold values by the UE and determining offloading of the UE from a first radio access network to a second radio access network by the UE by evaluating, the updated ATSP threshold values of the ANDSF policy with at least one of the current radio characteristics and load conditions of at least one of the RAN and the WLAN.

According to an embodiment herein, the method for providing network offloading in a wireless communication further comprises obtaining, by the Radio Access Network (RAN) node, a plurality of user equipment (UE) capabilities based on at least one of current radio characteristics and load condition of the RAN node.

According to an embodiment herein, wherein the RAN node being at least one of: an eNodeB (eNB); a NodeB; and a wireless local area network (WLAN) access point (AP).

According to an embodiment herein, the method for providing network offloading in a wireless communication further comprises providing a validity period for the modified ATSP threshold values to the UE if the RAN node decides to move the UE from a first network to a second network or if the RAN node decides when the UE should consider moving from the second access network to first access network.

According to an embodiment herein, the plurality of UE capabilities comprises of at least one of dual attachment capabilities associated with the UE including IP Flow Mobility (IFOM), Multi Access PDN Connectivity (MAPCON) capabilities, capability to handle the ATSP, capability to handle the updated ANDSF threshold values from the network or any form of dual attach access capability support in the UE.

According to an embodiment herein, the RAN node modifies/updates/enhances the ATSP threshold values based on at least one of: a load condition at the RAN node; radio characteristics at the RAN node and a type of service being requested by the UE.

According to an embodiment herein, the RAN node provides the modified ATSP threshold values to the UE through one of: a dedicated Radio Resource Control (RRC) message; an RRC broadcast message, a Non Access Stratum signalling message; and an 802.11 Beacon frame.

According to an embodiment herein, the eNB obtains the ATSP threshold values to be modified/updated/enhanced through an OMA DM protocol from the ANDSF.

According to an embodiment herein, the eNB obtains the ATSP threshold values to be modified/updated/enhanced through an SI-AP message from the MME.

According to an embodiment herein, the RAN node decides on the modified threshold value based on a pre-configuration by a core network or obtains a value from the core network, where the RAN node selects the modified/updated/enhanced threshold values based on at least one of a RAN node condition such as overload, network congestion, traffic shaping, radio characteristics and load balancing.

According to an embodiment herein, the plurality of criteria's associated with the ATSP for network (re)selection comprises of: load at the RAN node; service type which is to be offloaded to the network; presence of a service type which is to be selected by the network; signal strength parameters threshold values of the RAN node(s) for selecting the network (Reference Signal Received Power (RSRP), Reference Signal Received Quality (RSRQ), Received Channel Power Indicator (RCPI), Received Signal Strength Indication (RSSI), Received Signal to Noise Indicator (RSNI)); quality of service (QoS) parameters at the RAN node(s) at which UE handover the network; signal strength threshold which acts as a trigger for the UE to start the search and select other network access technology; periodicity of network scans; and core network load threshold.

According to an embodiment herein, the network offloading is determined based on at least one of a traffic profile and a QoS measurement.

According to an embodiment herein, the radio access network comprises one of a LTE network, a Universal Mobile Telecommunications System (UMTS), a GSM EDGE Radio Access Network (GERAN), and a Wi-Fi network.

According to an embodiment herein, the method for providing network offloading in a wireless communication further comprises sending offloading command by a RAN node to the UE to perform the offloading with the second radio access network.

Embodiments herein further provide a method of providing network offloading by a User Equipment in a wireless communication. The method comprising steps of obtaining an Access Technology Selection Policy (ATSP) from at least one of Access Network Discovery and Selection Function (ANDSF) and pre-configuration and Mobile Management Entity (MME), obtaining, by the UE, at least one of RAN radio conditions, RAN load conditions, WLAN radio conditions, and WLAN load conditions, determining offloading from a first radio access network to a second radio access network by evaluating the ANDSF ATSP threshold values with at least one of the RAN radio conditions, RAN load conditions, WLAN radio conditions and WLAN load conditions and performing offloading with the second radio access network. The ATSP comprises of a plurality of network selection criteria threshold values.

According to an embodiment herein, the method further comprises of updating the ANDSF ATSP threshold values by the UE, evaluating the plurality of network selection criteria's with at least one of the RAN radio conditions, RAN load conditions, WLAN radio conditions and WLAN load conditions and performing offloading from the first radio access network to the second radio access network based on the evaluation.

According to an embodiment herein, the method further comprises of establishing a PDN connection over the WLAN based on the UE capability, when the UE decides to select the WLAN for offloading.

Embodiments herein also disclose a system for providing network offloading in a wireless communication, the system comprising: a plurality of user equipments (UE) in communication with an eNodeB of a network, wherein the eNodeB is adapted for obtaining an Access Technology Selection Policy (ATSP) from at least one of Access Network Discovery and Selection Function (ANDSF), pre-configuration and Mobile Management Entity (MME), wherein the ATSP comprises of a plurality of network selection criteria threshold values; modifying the ANDSF ATSP threshold values based on at least one of the radio characteristics and load conditions of the RAN node by the RAN node; updating the ANDSF policy with the received modified ATSP threshold values by the UE; sending the modified ATSP threshold values to the UE; and determining offloading of the UE from a first radio access network to a second radio access network by the UE by evaluating the updated ATSP threshold values of the ANDSF policy with the current radio characteristics and load conditions of at least one of the RAN and the WLAN.

According to an embodiment herein, the enode B is adapted for obtaining, a plurality of user equipment (UE) capabilities based on at least one of radio characteristics, load condition of the RAN node.

According to an embodiment herein, the plurality of UE capabilities comprises of dual attachment capabilities associated with the UE including IP Flow Mobility (IFOM), Multi Access PDN Connectivity (MAPCON) capabilities, capability to handle the ATSP, capability to handle the updated ANDSF threshold values from the network or any form of dual attach access capability support in the UE.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

Modified threshold value, updated threshold value and enhanced threshold value means the same and used interchangeably in this specification

BRIEF DESCRIPTION OF THE
ACCOMPANYING DRAWINGS

The above and other objects, features and advantages will occur to those skilled in the art from the following description of the preferred embodiment and the accompanying drawings in which.

Although specific features of the present invention are shown in some drawings and not in others, this is done for convenience only as each feature may be combined with any or all of the other features in accordance with the present invention.

DETAILED DESCRIPTION OF EMBODIMENTS
OF THE INVENTION

The present invention provides a method and system for offloading of wireless connections from a LTE network to a Wi-Fi network and vice versa. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
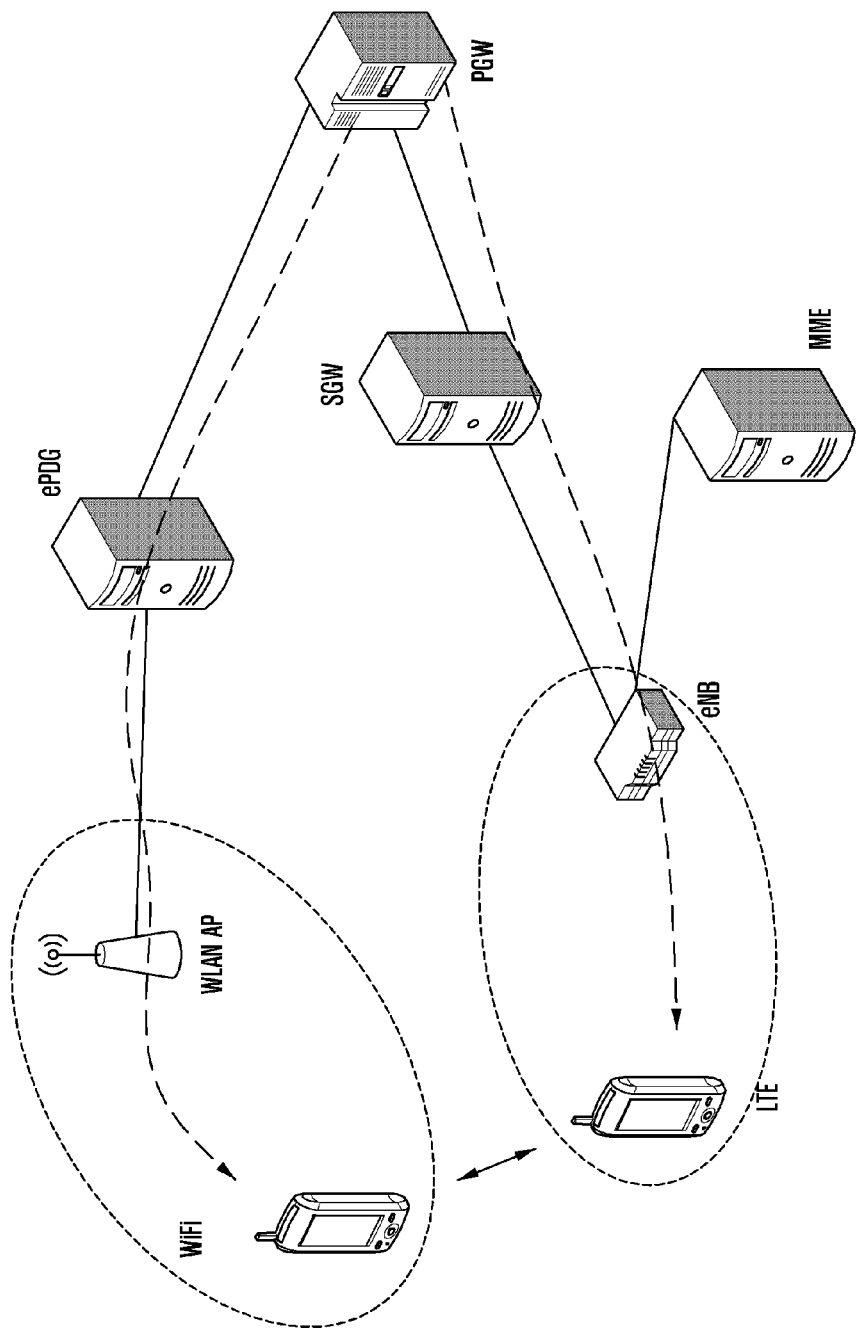
FIG. 1 is a perspective diagram illustrating a wireless network system, according to a prior art context.

FIG. 1 is a schematic diagram illustration of a wireless network system, in the context of the prior art. FIG. 1 illustrates an interworking model for IP Flow Mobility and Seamless Offload (IFOM) capable UE.

The 3GPP has specified the Evolved Packet Core (EPC), which is the next generation core network for cellular networks. The EPC defines the following key functions; the Serving Gateway (S-GW), the PDN Gateway (P-GW) and the Mobility Management Entity (MME). In particular, the EPC allows the use of simultaneous PDN connections. That is, a mobile device can configure multiple Access Point Names (APN) and receive multiple IP addresses on the single 3GPP wireless interface. In addition the EPC also provides wireless access to non 3GPP networks such as Wi-Fi (WLAN). An PDN connection, such as in particular IP connection, may be established between a User Equipment having access to an IP network (such as for example the Internet) via an IP Connectivity Access Network (such as for example EPS), and an IP connection endpoint in said IP network, Traffic related to various applications may be carried by such IP connection. The 3GPP already specified the non 3GPP non trusted WLAN access by means of the evolved Packet Data Gateway (ePDG). The ePDG, the untrusted non-3GPP network (for example, I-WLAN, Wi-Fi hotspot (hotspot), and so on) plays the role of the Security node.

The support for heterogeneous wireless access combined with the availability of multi-mode mobile devices opens opportunities for new usage. Functions IP Flow Mobility (IFOM) and Multi-Access PDN CONnectivity (MAPCON) are two of the future usages envisioned by 3GPP. MAPCON refers to the capability of simultaneously using two or more APNs over different wireless access networks (e.g. LTE and Wi-Fi) (one APN on a 3GPP access and another APN on a non-3GPP access.). IFOM refers to the capability of using the same APN across two wireless access networks (e.g. LTE and Wi-Fi). MAPCON enables use cases such as using LTE for QoS demanding applications and Wi-Fi for best effort traffic. IFOM enables seamless roaming of applications across LTE and Wi-Fi technologies. IFOM further allows a terminal to be connected to multiple access networks at the same time with the same IP addresses and with the Local mobility anchor (LMA) controlling which IP flows (defined by the n-tuple source address, source port, destination address, destination port, IP protocol) are directed via each access network.

Currently a key tool to strive IP traffic over a non-3GPP technology is the Access Network Discovery and Selection Function (ANDSF). The ANDSF transfers to the UE the mobile operator policy to connect through non 3GPP access technologies such as Wi-Fi and WiMAX and enables thus a traffic steering that adapts to the QoS and traffic of the controlled LTE network.

According to the 3GPP specification, there exists two ways of providing IP mobility between 3GPP and Wi-Fi networks. These include a proactive way in which when an UE is MAPCON capable and has the possibility to distribute its flows among several P-GWs via their associated interfaces on the UE and an adaptive way in which when the IP Flow Mobility (IFOM) is performed, a flow leads to a change of Serving Gateway (SGW). The IFOM has been driven by the ANDSF.

In an exemplary embodiment, a UE that is not capable of routing IP traffic simultaneously over multiple radio access interfaces (e.g. a non-IFOM or non-MAPCON capable UE, or a UE not capable of non-seamless WLAN offload) shall select the most preferable available access network for inter-system mobility based on the received/provisioned inter-system mobility policies and user preferences. When automatic access network selection is used, the UE shall not initiate a connection to the EPC using an access network indicated as restricted by inter-system mobility policies. When the UE selects a non-3GPP radio access as indicated by the preferences in the inter-system mobility policies, the UE may still use 3GPP access for CS services.

In another exemplary embodiment, a UE that is capable of routing IP traffic simultaneously over multiple radio access interfaces (i.e. an IFOM or MAPCON capable UE, or a UE capable of non-seamless WLAN offload) may be pre-provisioned with or shall be able to receive from the ANDSF (if the UE supports communication with ANDSF) both inter-system mobility policies and inter-system routing policies. When the UE has the IFOM, the MAPCON and the non-seamless WLAN offload capabilities disabled, the UE shall select the most preferable available access network based on the received/provisioned inter-system mobility policies and user preferences. When the UE has the IFOM or MAPCON or non-seamless WLAN offload capability enabled, the UE shall select the most preferable available access networks based on the received/provisioned inter-system routing policies and user preferences. In addition, the UE shall route traffic that matches specific criteria according to the filter rules in the received/provisioned inter-system routing policies and according to the user preferences.

According to FIG. 1, 3GPP specification provides interworking between 3GPP and Wi-Fi at the CN level but not at the RAN level. However, the present invention provides a method and system for eNB controlling the Wi Fi offloading based on its radio characteristics and load scenarios, specifically in the eNB-Wi-Fi combo base station deployment scenario. In order to overcome this problem, the present invention provides a method to use the IFOM with the eNB controlling on the usage of IFOM by the UE for efficient and real-time offloading.

Figure 2:
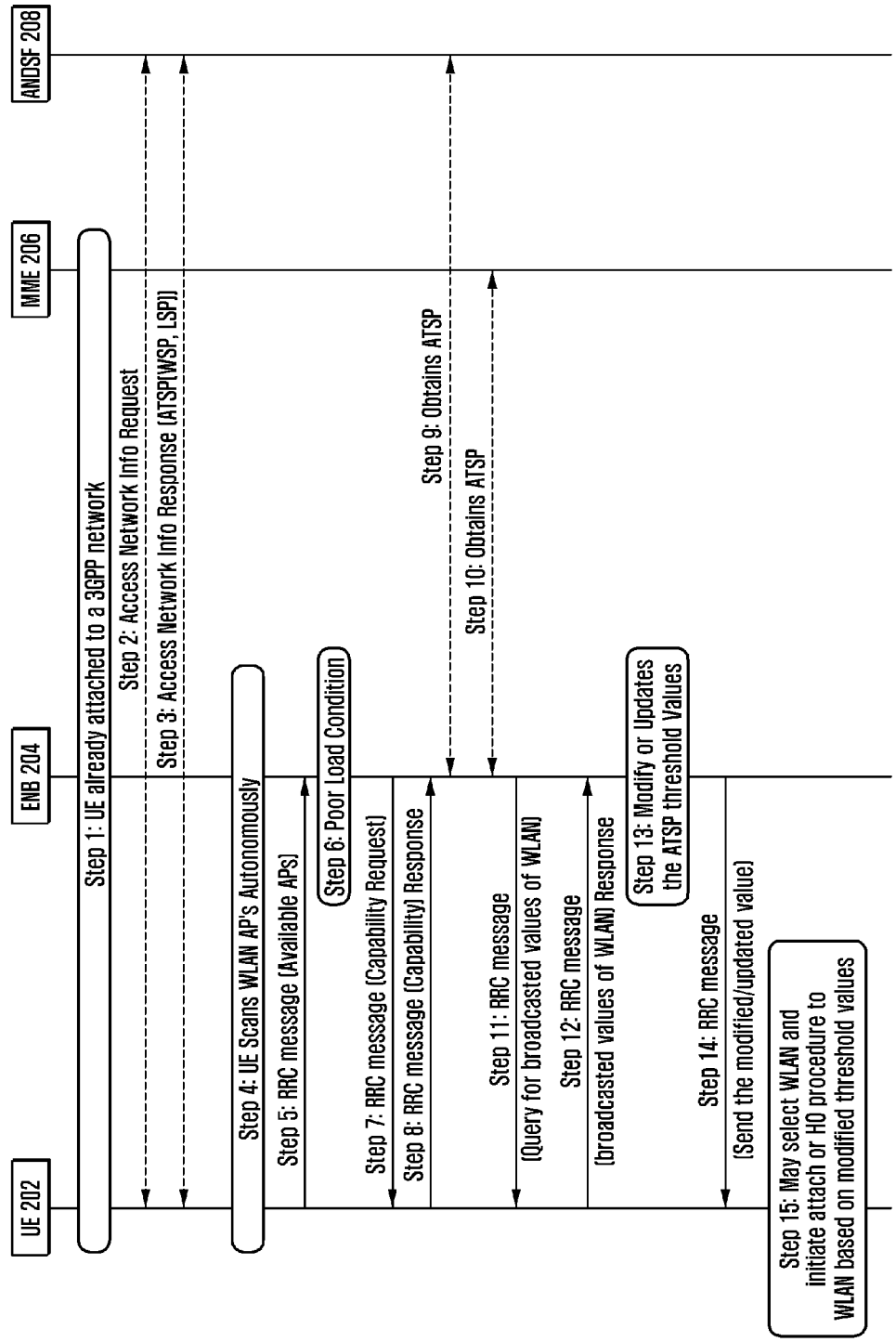
FIG. 2 is a flow diagram illustrating an exemplary process of managing network offloading of a UE by an eNB, according to an embodiment of the present invention.

FIG. 2 is a flow diagram illustrating an exemplary process of managing network offloading of a UE by an eNB, according to an embodiment of the present invention. According to FIG. 2, UE 202 is attached to a 3GPP network. At step 2, the UE 202 after attaching and gaining access with the EPC, sends an access network information request to an access network discovery and selection function (ANDSF) 208. In an embodiment, the UE 202 includes its capabilities in the request message to the ANDSF 208. The UE capabilities include at least supported radio access technologies (for example: WLAN, WiMAX). The interface protocol between the ANDSF and the UE may be OMA DM protocol (for example, using S14 reference point as defined in 3GPP TS 23.401 specification).

At step 3, the ANDSF 208 sends an access network info response to the UE 202 in response to the access network info request. The ANDSF 208 includes the policy based on the device capabilities. The embodiments herein provide new Management Objects (MOs) for the offloading case (to RAN and to WLAN). This new MOs are included by the ANDSF server in the access network info response message for the UE. The new MOs are the criteria for the selection of a network and/or wireless technology, which is hereafter called as Access Technology Selection Policy (ATSP). In case of WLAN, then the ATSP is termed as WLAN Selection Policy (WSP). The WSP includes at least one of the following criteria for WLAN selection or reselection, WLAN Load threshold (may be the load threshold of basic service set (BSS) and/or individual AP, WAN metrics), 3GPP RAN Load threshold (load at the eNB), service type (as tuple (Protocol, Port) or Access Point Name (APN)) that needs to be offloaded to a WLAN AP (when available) or in presence of the service type the WLAN network to be selected, the signal strength/quality of service parameters at the AP at which the user equipment should handover or select the network, signal strength threshold value (RSRP, RSRQ) at the eNB 204 or at the WLAN (Received Channel Power Indicator (RCPI), Received Signal Strength Indication (RSSI), Received Signal to Noise Indicator (RSNI)) value which acts as a trigger for the UE 202 to start the search and/or select other wireless access technology, periodicity of Wi-Fi subsequent scans, Core Network load condition (for example, backhaul interface load threshold). The ANDSF 208 provides a high level static policy to control the handover/offloading to a WLAN or WLAN (re)selection but the ANDSF policies currently does not capture the eNB parameters like load, interference or any eNB level resource considerations (e.g., Radio access level considerations) into account when deciding the WLAN (re)selection/access policies. In order to facilitate the eNB parameters like load at the eNB to be considered into the ANDSF policy for deciding heterogeneous network offloading dynamically and efficiently.

Further, in case of LTE, then the ATSP is termed as LTE Selection Policy (LSP). The LSP includes at least one of the following criteria for LTE selection or reselection, 3GPP RAN Load threshold (load at the eNB), service type (as tuple (Protocol, Port) or Access Point Name (APN)) that needs to be offloaded to a LTE network (when available) or in presence of the service type the LTE network to be selected, the signal strength assistance parameter thresholds of the eNB for selecting the LTE network (the signal strength parameters threshold are Reference Signal Received Power (RSRP), Reference Signal Received Quality (RSRQ) and so on), quality of service parameters threshold at the eNB at which the user equipment should handover or select the network, signal strength threshold at the eNB which acts as a trigger for the UE to start the search and select other wireless access technology, such as core network load threshold.

The ANSDF 208 provides default threshold values (pre-configured by the network) to the UE 202.

In an embodiment, the ANSDF 208 further pushes the updated policy to the UE 202, which has already established the session with the ANDFS server or ANDSF initiates session with the UEs, if there is change in the criteria or configuration (threshold) and/or based on the network conditions (congestion or load balancing).

At step 4, the UE 202 may decide to keep the existing network or to move other network, based on the policy (including ATSP) obtained from the ANDSF 208.

Now, consider that the UE decided to keep the 3GPP access and autonomously performs a search for an AP. During the autonomous scan, consider that the UE finds an access point. In such case, at step 5, the UE 202 may send a radio resource connection (RRC) message indicating availability of a Wi-Fi access point. The RRC message can be a measurement report message or can be a new RRC message. Further the UE 202 may include the details of the WLAN like, but not limited to, WLAN broadcasted load threshold, Received Signal Strength Indication.

At step 6, there is a load change (or critical condition) in the eNB 204, and then the eNB 204 would spontaneously decide whether to keep the UE in the existing (selected/attached) network or to move the UE 202 to other network (example, WLAN). If the eNB 204 decides to move (offload) the UE 202 (some of the UEs) to other network (WLAN), then following procedure are performed.

At step 7, optionally the eNB 204 queries the UE 202 for dual attachment capabilities. The dual attachment capabilities are the multiple PDN and/or Radio Access Technology (RAT) simultaneous access capability support in the UE and also in the network, support for modified/updated/enhanced ANDSF threshold value handling. An example of dual attachment capabilities can be either IP Flow Mobility (IFOM) and/or Multi Access PDN Connectivity (MAPCON) capabilities and/or any other form of dual attach capabilities between heterogeneous radio access technologies (for example, WLAN and LTE). The eNB 204 sends RRC request message to the UE 202, which includes parameter to indicate that eNB 204 needs UE supported IP mobility capability information. In an embodiment, the RRC request message being UECapabilityEnquiry message which includes for example the Inter System PDN handling Capability parameter. In an embodiment, the eNB 204 obtains the UE capability from the MME or from the UE 202 during initial attach procedure.

At step 8, the UE 202 sends a response message indicating Dual attachment capabilities (e.g., IP flow mobility (IFOM) capabilities, support for modified/updated/enhanced ANDSF threshold value handling) to the eNB, if the UE 202 received the request message from the eNB 204 in step 7. The UE 202 sends RRC response message to the eNB 204 including the UE 202 supported PDN handing capability. In an embodiment, the RRC response message being UECapabilityInformation message, includes the supported PDN handling Capabilities (None or IFOM and/or MAPCON and/or other possible capabilities (non-seamless Handover, support for handling the ATSP, support for handling the modified threshold values)) parameters/Information Elements.

At step 9, optionally the eNB 204 obtains ANDSF ATSP parameters for offloading the particular bearer/PDN connection/APN of the UE 202 to the WLAN or to make the UE 202 to select the WLAN network and to obtain the request service. The eNB 204 can fetch the ANDSF policy from the ANDSF server at any point in time, i.e., either periodically or based on specific triggers from the OAM entity or the ANDSF server can PUSH the policy to an eNB whenever some relevant elements of the policy changes. The ANDSF 208 uses a device management protocol and any eNB 204 has enough proprietary interfaces with other nodes (for Operations, Administration, Maintenance (OAM) purposes), so there is no restriction for any tunnel or interface to be implemented strictly between the ANDSF 208 and the eNB 204. The policy transfer between the ANDSF 208 and the eNB 204 could be via the OAM protocols.

At step 10, optionally, the eNB 204 fetches the ATSP parameters from an MME 206 using the S1-AP (S1-MME) interface. In an embodiment, the e-NB is pre-configured with the ANDSF MO threshold values that to be modified/updated/enhanced and broadcasted or send in unicast message to the UE by the network (Operator). The threshold values are modified/updated/enhanced based the eNB 204 load condition (for example, about to overload, under congestion, load balancing).

At step 11, optionally the eNB 204 queries the UE 202 for the current information (e.g., load/interference) associated with the available Wi-Fi Access Points (AP), through the RRC message, to get the current condition of the Wi-Fi AP.

At step 12, the UE 202 may obtain the related parameter and respond the obtained details to the eNB 204 in the RRC message, if the UE 202 receives the request from the eNB 204 in step 11. The related parameters being at least one of: load threshold, Received Channel Power Indicator (RCPI), Received Signal Strength Indication, Received Signal to Noise Indicator (RSNI), Basic Service Set (BSS) load, Wi-Fi identity (Basic Service Set Identification (BSSID), Service Set Identifier (SSID)), and so on.

At step 13, based on the received UE capability, ANDSF threshold values and considering its load condition (for example, about to overload, under congestion, load balancing), eNB 204 decides whether keep the UE 202 in the existing (selected/attached) network or to indicate to the UE 202 to move to other network (example, WLAN) or send offloading command to the UE to offload particular traffic to other radio access network. If the eNB 204 decides to move the UE 202, then the eNB 204 modifies (or updates or enhances) the network selection criteria threshold values and indicates it to the UE, so that UE can select the available WLAN network for service continuity or to obtain better service. The eNB modifies/updates/enhances the threshold values, to recover from critical conditions (congestion) or to provide better service to other UEs or provide better service to other PDNs.

The eNB modifies the ANDSF ATSP threshold values based on a set of parameters like the radio characteristics/conditions, the load at the eNB or the type of load (type of applications). For example, the eNB modifies ATSP threshold values based on the eNB and/or Wi-Fi load conditions. In some embodiments, an ANDSF proxy residing in the eNB obtains the ANDSF ATSP and modifies/updates/enhances the ANDSF ATSP threshold values based on the current status of the eNB.

The eNB may also specify the validity period of the modified/updated/enhanced thresholds. The validity time implies at least one that: the eNB decides when the UE should consider moving from the second access network to first access network, the UE replaces the default threshold values once the validity time elapses.

The method disclosed herewith is, the eNB is in the middle of providing the ANDSF policy from the ANDSF server to the UE ("proxy") dynamically for better network selection based on radio characteristics/conditions. This would mean e.g. that whenever there is a load change (or critical condition) the eNB would spontaneously decide whether keep the UE (or set of UEs) in the existing (selected/attached) network or to move the UE (or more than one UE) to other network (example, WLAN) and provide a modified/enhanced threshold values in the ANDSF policy to the UE, if it decides to move the UE. So that the UE 202 re-evaluates the modified/enhanced threshold values of the ANDSF policy with the current radio conditions (of RAN and/or WLAN) and may (re)select the WLAN to obtain the service.

Alternatively, the MME entity in an LTE network may also provide updated/modified threshold values to the eNBs (using S1_AP message) or to the UEs directly (NAS message), so that UE may select the WLAN to obtain requested service. The MME may send such a signal through a Non Access Stratum message or indicate the same to an eNB via an S1 AP message and the eNB in turn indicates this to UEs either through a broadcast message or through a dedicated RRC message. In an embodiment, the above information on the modified values can be obtained during step 9 or step 10.

At step 14, the eNB sends the modified ATSP criteria threshold values to the UE. In an embodiment, the eNB may change more than one ATSP criteria threshold value. The eNB may push the modified threshold values through a new RRC message (example new System Information Block (SIB)) or an existing RRC message (RRC message being at least one of: System Information Block (SIB), RRC reconfiguration message, HO Command, System Information Block (SIB) and so on) or through any other mechanism (like new dedicated RRC message).

It is efficient and effective option to dynamically select the threshold values by the eNB based on its conditions (Overload, Congestion, traffic shaping, load balancing) and providing the modified/updated/enhanced threshold values from the eNB to the UE through RRC messages as the eNB is the radio access entity that has to ensure a certain quality of service to users under radio access overload, congestion and interference conditions.

In some embodiment, the eNB instead of sending the modified ATSP threshold values, it sends the offloading command (RRC dedicated signaling message) to the UE to command the UE to offload particular traffic to particular radio access network. The eNB selects and decides to send the offloading command, considering at least one of RAN radio characteristics, RAN load condition, WLAN radio characteristics and WLAN load conditions. The WLAN related parameters are obtained in the step 12 or alternatively from the WLAN AP directly or through some other means like through intermediate network entity.

At step 15, the UE decide based on the updated/modified/enhanced threshold, whether to be in the existing network or to move to other network or to select the other network for simultaneous access. If UE decides to select WLAN, then based on its capability it initiates PDN connection establishment over WLAN procedure. In an embodiment, the UE updates the received threshold values in the ANDSF policy, evaluates the network selection/reselection criteria with the current radio and/or load parameters and decides the traffic offloading.

According to an exemplary illustration herein, the ANDSF policy includes the network selection criteria default threshold values (for example, Received Signal Strength Indicator (RSSI) is less than $RSSI_{Threshold}$), so that UE can select the WLAN if the RSSI of the available WLAN is less than $RSSI_{Threshold}$ by default. This policy is provided by the ANDSF to the UE directly. When there is a load change (or critical condition) in the eNB, then eNB spontaneously decides whether to keep the UE in the existing (selected/attached) network or to move the UE to other network (example, WLAN). If the eNB decides to move the UE (some of the UEs), then the eNB optionally obtains the $RSSI_{Threshold}$ value provided by the ANDSF from the ANDSF server directly or from MME or locally (the value might be cached or preconfigured) and provide a new modified or updated or enhanced $RSSI_{Threshold}'$ to the UE. The eNB provide the modified criteria threshold value either through dedicated RRC message (for example, RRC Reconfiguration) or through RRC broadcast message (for example, SIB). The eNB obtains the policy from ANDSF through OMA DM protocol or from MME through SI-AP message (for example, ENB Configuration Update and ENB Configuration Update Acknowledge). The eNB decides on the modified threshold value ($RSSI_{Threshold}'$) based on pre-configuration by the core network or obtains the value from the core network (from MME or from OAM server or from other entity in the network). If the eNB wants to consult the network to decide on the threshold value to be modified, then the eNB sends a request message to the network and which includes any of the following parameters in the request message such as current condition of the eNB, information of the available networks (available to the UE) (for example, WLAN), information of the available network ($RSSI_{Threshold}$). The current condition of the eNB includes any of the following such as: overloaded, under congestion, about to overload, crunch in resources or could not allocate request QoS. The UE updates ANDSF policy with the modified/updated/enhanced threshold values (for example $RSSI_{Threshold}'$) received from RAN, and (re)evaluates the updated ANDSF policy with the current radio conditions (of RAN and/or WLAN), then the UE may select the WLAN network and obtain service through WLAN. If the UE decides to select the WLAN, then UE initiates PDN establishment procedures as defined in 3GPP TS 23.402. Alternatively, the eNB sends an RRC message (for example, Handover command) to the UE to handover certain bearers to WLAN. For e.g. ANDSF WSP says "move APN if RSSI <5 dB" and RAN under critical condition or for better user experience, decides to move some of the UEs, then decides on the threshold value (pre-configured or obtained from network entity) and broadcasts or using dedicated signalling indicates "update RSSI threshold to 3 dB". So from UE perspective, the current WSP criteria becomes "move APN if RSSI <3 dB". The above examples are applicable for selecting LTE network also and handover from WLAN network with appropriate criteria.

Figure 3:
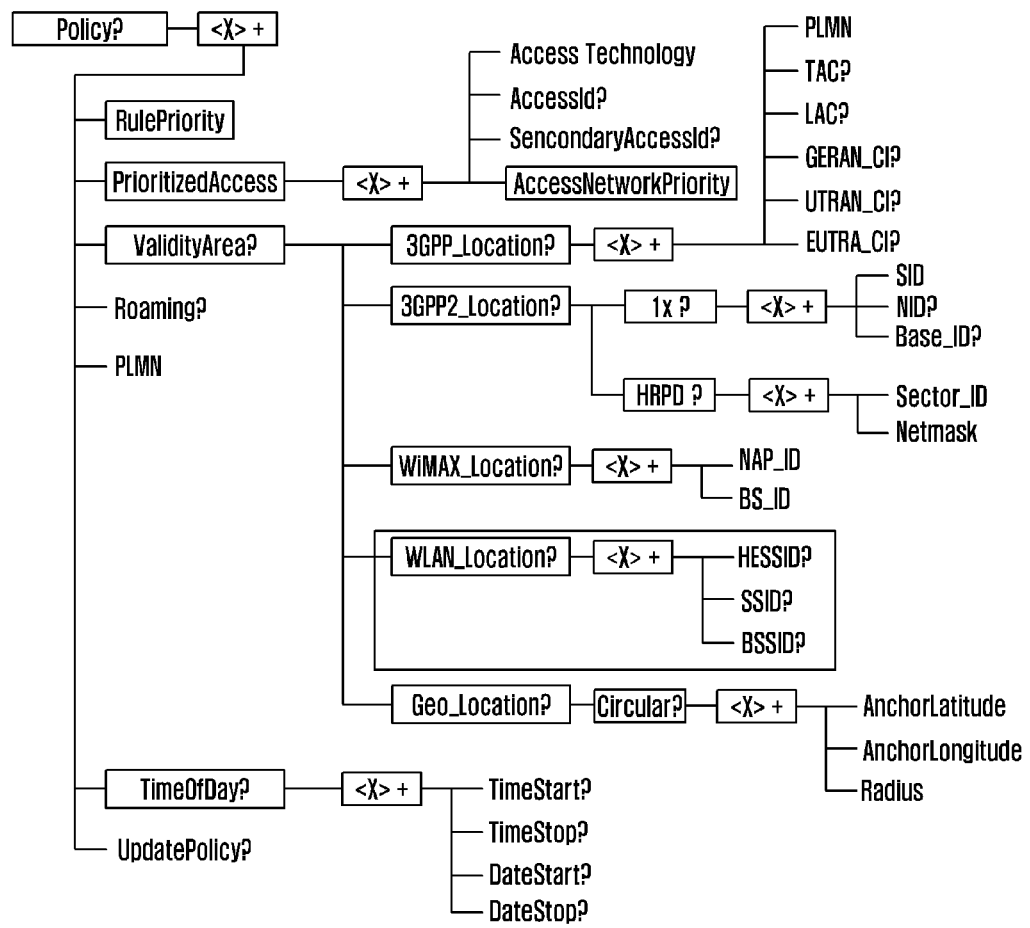
FIG. 3 is a schematic representation of an ANDSF ATSF policy, according to an example illustration of the present invention.

FIG. 3 is a schematic representation of a modified ANDSF ATSF policy, according to an example illustration of the present invention. According to an embodiment of the present invention, the enB modifies ANDSF policies based on the eNB and/or Wi-Fi load conditions. The UE indicates the availability of the AP and not the load information. The eNB then updates the local policy based on the instantaneous information and sends the updated policy to the UE based on the requirements. The 3GPP currently does not define an eNB-ANDSF relation. In an embodiment of the present invention, the ANDSF uses a device management protocol and any eNB has appropriate interfaces with other nodes (for OAM purposes), so there is no restriction for ANDSF to be implemented strictly between the ANDSF and the eNB via an OAM protocol. In an exemplary embodiment of the present invention, a proxy ANDSF is used at the eNB itself and the implementation of the ANDSF with the proxy ANDSF is left open.

Figure 4:
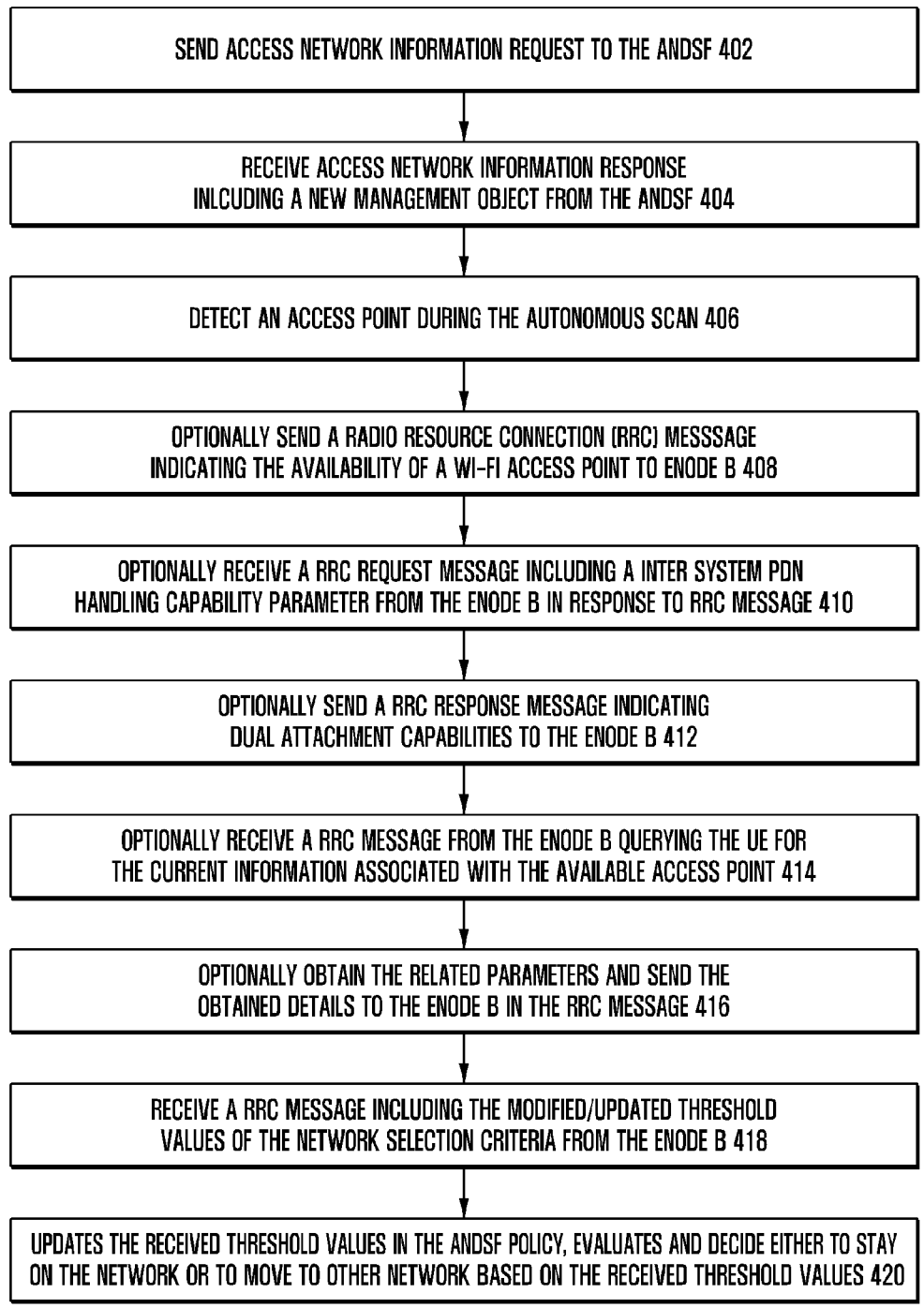
FIG. 4 is a flow chart illustrating an exemplary process of managing network offloading by an UE, according to an embodiment of the present invention.

FIG. 4 is a flow chart illustrating an exemplary method of managing network offloading by an UE, according to an embodiment of the present invention. At step 402, an access network information request including the capabilities of the UE is sent to the ANDSF. At step 404, an access network information response message including a new management object which includes the network selection criteria threshold values (default threshold values) is received from the ANDSF. At step 406, an access point is detected based on the autonomous scan. At step 408, an RRC message indicating the availability of a Wi Fi access point is sent to the eNB optionally. At step 410, an RRC request message including a inter system PDN handling capability parameter is received from the eNode B in response to the RRC message optionally. At step 412, a RRC response message indicating the dual capabilities of the UE is sent to the eNB optionally. At step 414, a RRC message querying the UE for the current information associated with the available access point and its radio characteristics and/or load conditions is received from the eNB optionally. At step 416, the UE collects related parameters associated with the WLAN are obtained and are sent to the eNB in the RRC message optionally. At step 418, an RRC message including the modified/updated/enhanced threshold values of the network selection criteria are received from the eNB. At step 420, the UE updates the received threshold values in the ANDSF policy. The UE evaluates and decides to stay on the current network or move to other networks based on the received modified/updated threshold values (by updating the ANDSF policy and evaluates ANDSF policies based on radio characteristics (for example measured RSRP/RSCP) and/or load conditions).

Figure 5A:
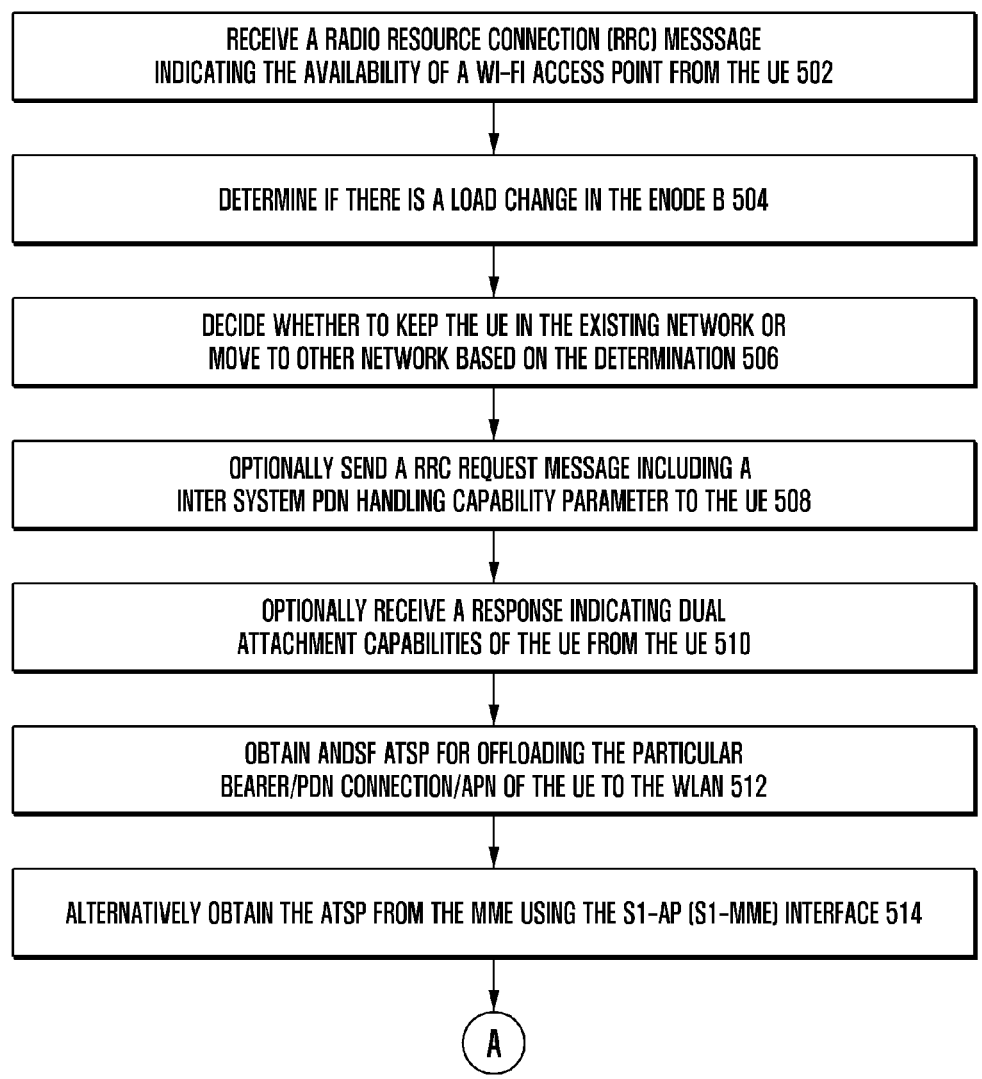
FIGS. 5A and 5B are flow charts illustrating an exemplary process of managing network offloading by an enode B, according to an embodiment of the present invention.
Figure 5B:
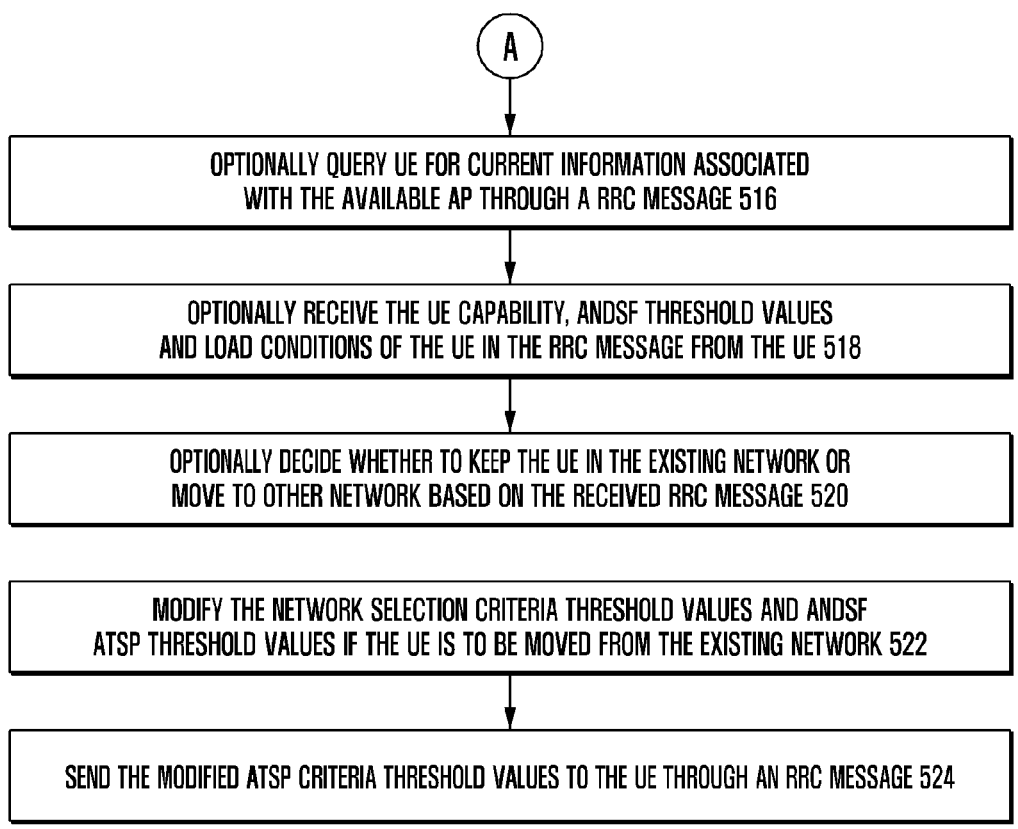

FIGS. 5A and 5B are flow charts illustrating an exemplary method of managing network offloading by an eNB, according to an embodiment of the present invention. At step 502, an RRC message indicating the availability of a Wi-Fi access point is received by the eNB optionally. At step 504, it is determined that there is a load change in the eNB (congestion or above to overload). At step 506, eNB decides whether to keep the UE in the existing network or to move to other network based on the determination. At step 508, a RRC request message including a inter system PDN handling capability parameter is sent to the UE optionally. At step 510, a RRC response message indicating the dual capabilities of the UE is received from the UE optionally. At step 512, ANDSF ATSP is obtained from the ANDSF for offloading the particular bearer/PDN connection/APN of the UE to the WLAN. Alternatively, at step 514, the ATSP is obtained from the MME using the S1-AP (S1-MME) interface or the network pre-configures the threshold values that to be modified and indicated to the UE for the appropriate radio/load conditions. At step 516, optionally UE is queried for current information associated with the available AP through a RRC message. At step 518, the UE capabilities, ANDSF threshold values and the load conditions of the UE are received in an RRC message from the UE optionally. At step 520, eNB decides whether to keep the UE in the existing network or to move to other network based on the received RRC message. At step 522, the network selection criteria threshold values of ANDSF (ATSP threshold values) are modified/updated/enhanced if the eNB decides to move the UE from the current network. At step 524, the modified/updated/enhanced threshold values are sent to the UE in an RRC message so that the UE can initiate PDN connection establishment over the WLAN procedures based on its capability.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, firmware, and/or software embodied in a machine readable medium. Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A method by a radio access network (RAN) node for providing network offloading in a wireless communication, the method comprising—:
   obtaining an Access Technology Selection Policy (ATSP) including a plurality of network selection criteria threshold values from at least one of an Access Network Discovery and Selection Function (ANDSF) and Mobile Management Entity (MME);
   modifying at least one network selection criteria threshold value included in the ATSP based on at least one of a radio characteristic and a load condition of the RAN node;
   sending the at least one modified network selection criteria threshold value to a user equipment (UE); and
   providing a validity time for the at least one modified network selection criteria threshold value to the UE,
   wherein the at least one modified network selection criteria threshold value is used for updating an ANDSF policy, and it is determined whether to offload from a first RAN to a second RAN by evaluating the updated ANDSF policy.

2. The method of claim 1, further comprising:
   obtaining a plurality of UE capabilities based on the radio characteristic and the load condition of the RAN node.

3. The method of claim 2, wherein the plurality of UE capabilities comprises at least one of dual attachment capabilities associated with the UE including internet protocol (IP) Flow Mobility (IFOM), Multi Access packet data network (PDN) Connectivity (MAPCON) capabilities, capability to handle the ATSP, and capability to handle network selection criteria threshold values.

4. The method of claim 1, wherein the RAN node includes at least one of:
   an eNodeB (eNB);
   a NodeB; and
   a wireless local area network (WLAN) access point (AP).

5. The method of claim 1, wherein modifying the at least one network selection criteria threshold value is performed based on at least one of:
   the load condition of the RAN node;
   the radio characteristic (condition) of the RAN node and
   a type of service being requested by the UE.

6. The method of claim 1, wherein sending the at least one modified network selection criteria threshold value to the UE is performed through one of:
   a dedicated Radio Resource Control (RRC) message;
   an RRC broadcast message;
   a Non Access Stratum signaling message; and
   an 802.11 Beacon frame.

7. The method of claim 1, wherein the RAN node obtains the ATSP through an open mobile alliance (OMA) device management (DM) protocol from the ANDSF.

8. The method of claim 1, wherein the RAN node obtains the ATSP through an S1-application protocol (AP) message from the MME.

9. The method of claim 1, wherein modifying the at least one network selection criteria threshold value is performed based on a pre-configuration or a value received from a core network, in consideration of a RAN node condition including at least one of overload, network congestion, traffic shaping and load balancing.

10. The method of claim 1, wherein a plurality of network selection criteria associated with the ATSP comprises at least one of:
    load at the RAN node;
    a service type of a network;
    presence of a service type;
    signal strength parameters threshold values of the RAN node;
    quality of service (QoS) parameters at the RAN node;
    signal strength threshold at the RAN node;
    periodicity of network scans; and
    core network load threshold.

11. The method of claim 1, wherein the RAN node belongs to at least one of a Long Term Evolution (LTE) network, a Universal Mobile Telecommunications System (UMTS), a GSM EDGE Radio Access Network (GERAN), and a Wi-Fi network.

12. The method of claim 1, further comprising:
    obtaining at least one of a RAN radio condition, a RAN load condition, a wireless local area network (WLAN) radio condition, and a WLAN load condition;
    determining whether to command offloading for the UE from a RAN to a WLAN by evaluating the at least one modified network selection criteria threshold value with at least one of the RAN radio condition, the RAN load condition, the WLAN radio condition and the WLAN load condition; and
    sending an offloading command to the UE to perform offloading to the WLAN, if it is determined to command the offloading for the UE.

13. The method of claim 1, wherein it is determined whether to offload from the first RAN to the second RAN by the UE in consideration of at least one of a traffic profile and a quality of service (QoS) measurement.

14. A radio access network (RAN) node for providing network offloading in a wireless communication, the RAN node comprising:
    a transceiver configured to communicate a signal or data; and
    a controller configured to control:
       obtaining an Access Technology Selection Policy (ATSP) including a plurality of network selection criteria threshold values from at least one of an Access Network Discovery and Selection Function (ANDSF) and a Mobile Management Entity (MME);
       modifying at least one network selection criteria threshold value included in the ATSP based on at least one of a radio characteristic and a load condition of the RAN node;
       sending the at least one modified network selection criteria threshold value to a user equipment (UE); and
       providing a validity time for the at least one modified network selection criteria threshold value to the UE,
    wherein the at least one modified network selection criteria threshold value is used for updating an ANDSF policy, and it is determined whether to offload from a first RAN to a second RAN by evaluating the updated ANDSF policy.

15. The RAN node of claim 14, wherein the controller is further configured to control:
    obtaining a plurality of UE capabilities based on at least one of the radio characteristic and the load condition of the RAN node.

16. The RAN node of claim 15, wherein the plurality of UE capabilities comprises at least one of dual attachment capabilities associated with the UE including internet protocol (IP) Flow Mobility (IFOM), Multi Access packet data network (PDN) Connectivity (MAPCON) capabilities, capability to handle the ATSP, and capability to handle network selection criteria threshold values.

17. The RAN node of claim 14, wherein the RAN node includes at least one of:
  an eNodeB (eNB);
  a NodeB; and
  a wireless local area network (WLAN) access point (AP).

18. The RAN node of claim 14, wherein modifying the at least one network selection criteria threshold value is performed based on at least one of:
  the load condition of the RAN node;
  the radio characteristic (condition) of the RAN node; and
  a type of service being requested by the UE.

19. The RAN node of claim 14, wherein sending the at least one modified network selection criteria threshold value to the UE is performed through one of:
  a dedicated Radio Resource Control (RRC) message;
  an RRC broadcast message;
  a Non Access Stratum signaling message; and
  an 802.11 Beacon frame.

20. The RAN node of claim 14, wherein the ATSP is obtained through an open mobile alliance (OMA) device management (DM) protocol from the ANDSF.

21. The RAN node of claim 14, wherein the ATSP is obtained through an S1-application protocol (AP) message from the MME.

22. The RAN node of claim 14, wherein modifying the at least one network selection criteria threshold value is performed based on a pre-configuration or a value received from a core network in consideration of a RAN node condition including at least one of overload, network congestion, traffic shaping and load balancing.

23. The RAN node of claim 14, wherein a plurality of network selection criteria associated with the ATSP comprises at least one of:
  load at the RAN node;
  a service type of a network;
  presence of a service type;
  signal strength parameters threshold values of the RAN node;
  quality of service (QoS) parameters at the RAN node;
  signal strength threshold at the RAN node;
  periodicity of network scans; and
  core network load threshold.

24. The RAN node of claim 14, wherein the RAN node belongs to at least one of an LTE network, a Universal Mobile Telecommunications System (UMTS), a GSM EDGE Radio Access Network (GERAN), and a Wi-Fi network.

25. The RAN node of claim 14, further comprising:
  obtaining at least one of a RAN radio condition, a RAN load condition, a WLAN radio condition, and a WLAN load condition;
  determining whether to command offloading for the UE from a RAN to a WLAN by evaluating the at least one modified network selection criteria threshold value with at least one of the RAN radio condition, the RAN load condition, the wireless local area network (WLAN) radio condition, and the WLAN load condition; and
  sending an offloading command to the UE to perform offloading to the WLAN if it is determined to command the offloading for the UE.

* * * * *